US012782720B2

(12) United States Patent
Scheffler-Juschtschenko et al.

(10) Patent No.: US 12,782,720 B2
(45) Date of Patent: Nov. 3, 2026

(54) HEAD-UP DISPLAY

(71) Applicant: Continental Automotive Technologies GmbH, Hannover (DE)

(72) Inventors: Willi Scheffler-Juschtschenko, Großostheim (DE); Andreas Buechel, Weiterstadt (DE); Nico Plagens, Aschaffenburg (DE)

(73) Assignee: AUMOVIO Germany GmbH

( * ) Notice: Subject to any disclaimer, the term of this patent is extended or adjusted under 35 U.S.C. 154(b) by 367 days.

(21) Appl. No.: 17/961,646

(22) Filed: Oct. 7, 2022

(65) Prior Publication Data

US 2023/0113774 A1 Apr. 13, 2023

(30) Foreign Application Priority Data

Oct. 8, 2021 (EP) .................................... 21201659

(51) Int. Cl.

| | |
|---|---|
| ***G02B 27/01*** | (2006.01) |
| ***B60K 35/60*** | (2024.01) |
| ***G02B 13/18*** | (2006.01) |
| ***G02F 1/1333*** | (2006.01) |
| ***G09G 3/00*** | (2006.01) |
| *B60K 35/23* | (2024.01) |

(52) U.S. Cl.

CPC .......... *G02B 27/0101* (2013.01); *B60K 35/60* (2024.01); *G02B 13/18* (2013.01); *G02F 1/133385* (2013.01); *G09G 3/002* (2013.01); *B60K 35/23* (2024.01); *B60K 2360/334* (2024.01); *G02B 2027/0118* (2013.01); *G09G 2380/10* (2013.01)

(58) Field of Classification Search

CPC ................ G02B 27/0101; G02B 13/18; G02B 2027/0118; G02B 2027/011; G02B 2027/0114; G02B 2027/012; G02B 2027/0127; G02B 2027/0185; G02B 3/02; G02B 2027/0123; G02B 2027/0196; G02B 27/0179; B60K 35/00; B60K 35/23; B60K 2360/334; B60K 2360/23; G02F 1/133385; G09G 3/002; G09G 2380/10; G03B 21/28

See application file for complete search history.

(56) References Cited

U.S. PATENT DOCUMENTS

| | | | |
|---|---|---|---|
| 5,867,287 | A | 2/1999 | Williams et al. |
| 2002/0003508 | A1 | 1/2002 | Schehrer et al. |
| 2006/0250696 | A1 | 11/2006 | Mcguire |

(Continued)

FOREIGN PATENT DOCUMENTS

| | | |
|---|---|---|
| CN | 101825748 | 9/2010 |
| CN | 104246578 | 12/2014 |

(Continued)

OTHER PUBLICATIONS

Machine translation of WO-2015150229-A1 (Year: 2015).*

(Continued)

*Primary Examiner* — Matthew Y Lee

(74) *Attorney, Agent, or Firm* — COZEN O'CONNOR

(57) ABSTRACT

A head-up display comprising an image generator with a light source, a tilted display, an aspheric mirror, an optical system, a transmissive screen, and an aspheric lens, wherein the aspheric lens is arranged between the tilted display and the aspheric mirror is disclosed.

11 Claims, 7 Drawing Sheets

(56) References Cited

U.S. PATENT DOCUMENTS

| | | | | |
|---|---|---|---|---|
| 2008/0192358 | A1* | 8/2008 | Watanabe | G02B 27/0101 359/633 |
| 2008/0238814 | A1 | 10/2008 | Ishikawa et al. | |
| 2010/0053753 | A1 | 3/2010 | Nestorovic et al. | |
| 2010/0053758 | A1 | 3/2010 | Nestorovic et al. | |
| 2011/0051029 | A1* | 3/2011 | Okumura | G02B 27/0101 359/831 |
| 2013/0194674 | A1 | 8/2013 | Horiuchi et al. | |
| 2017/0069611 | A1 | 3/2017 | Zhang et al. | |
| 2017/0299922 | A1 | 10/2017 | Matsuura et al. | |
| 2018/0003970 | A1 | 1/2018 | Otani et al. | |
| 2018/0017794 | A1 | 1/2018 | Zeh et al. | |
| 2018/0039077 | A1 | 2/2018 | Kuzuhara et al. | |
| 2018/0101005 | A1 | 4/2018 | Yamazoe | |
| 2018/0259770 | A1* | 9/2018 | Kuzuhara | G03B 21/142 |
| 2018/0299672 | A1* | 10/2018 | Yatsu | B60K 35/211 |
| 2018/0348515 | A1* | 12/2018 | Kuzuhara | B60K 35/00 |
| 2018/0356634 | A1 | 12/2018 | Riebe | |
| 2019/0162960 | A1* | 5/2019 | Harada | G02B 27/0101 |
| 2019/0225083 | A1 | 7/2019 | Yatsu et al. | |
| 2019/0369392 | A1 | 12/2019 | Matsuura et al. | |
| 2021/0018750 | A1* | 1/2021 | Kuzuhara | G02B 13/18 |
| 2022/0155589 | A1* | 5/2022 | Hirata | B60K 35/00 |

FOREIGN PATENT DOCUMENTS

| | | | | |
|---|---|---|---|---|
| CN | 109564350 | | 4/2019 | |
| CN | 112673297 | | 4/2021 | |
| JP | 2015118271 | A | 6/2015 | |
| JP | 2018036501 | A | 3/2018 | |
| JP | 2019175617 | | 10/2019 | |
| KR | 20170136807 | | 12/2017 | |
| KR | 20190044407 | | 4/2019 | |
| TW | 201943997 | | 11/2019 | |
| WO | 2015122491 | A1 | 8/2015 | |
| WO | WO-2015150229 | A1 * | 10/2015 | G02B 27/01 |

OTHER PUBLICATIONS

Hongjuan Wang et al. “Large aperture transparent beam steering screen based on LCMPA”, Applied Optics, vol. 55, No. 28, Sep. 23, 2016, pp. 7824-7829, XP055902752, ISSN: 0003-6935, DOI: 10.1364/AO.55.907824.

Extended European Search Report dated Mar. 28, 2022 from corresponding European patent application No. 21201659.6.

Extended European Search Report dated Mar. 28, 2022 from related European patent application No. 21201662.0.

Non-Final Office Action dated Dec. 13, 2024 from related U.S. Appl. No. 17/961,684.

Office Action of Chinese Patent Application No. 202211201197.6 dated May 31, 2025.

Office Action of related U.S. Appl. No. 17/961,684 dated Dec. 29, 2025.

Office Action of related U.S. Appl. No. 17/961,684, dated Aug. 27, 2025.

Office Action of related Chinese Patent Application No. 202211201197.6, dated Nov. 5, 2025.

Office Action of corresponding Chinese Patent Application No. 202211200523.1, dated Aug. 28, 2025.

Office Action of corresponding Chinese Patent Application No. 202211200523.1 dated Feb. 28, 2026.

Office Action of related Chinese Patent Application No. 202211201197.6 dated May 22, 2026.

* cited by examiner

HEAD-UP DISPLAY

CROSS REFERENCE TO RELATED APPLICATIONS

This U.S. patent application claims the benefit of European patent application EP21201659.6 filed Oct. 8, 2021, which is hereby incorporated by reference.

TECHNICAL FIELD

The disclosure is directed to head-up display, especially for automotive application, with improved sunlight reflection protection.

BACKGROUND

Automotive head-up displays are used to convey critical vehicle information directly in the field of view of the vehicle's conductor or driver. The information is delivered to the driver at a certain distance so that no or nearly no accommodation of the driver's eye is required when the driver switches from viewing the road in front of him to reading the vehicle's status shown as the virtual image. This approach reduces the reaction time of the driver by several hundreds of milliseconds, thus increasing road safety.

U.S. Pat. No. 5,867,287 relates to a head up display with a lens decentred to the optical axis of the illumination. It shows a decentred Fresnel lens and, as a separate part, a diffusor which is a heat absorbing glass.

WO 2015/122491 A1 relates to a liquid-crystal display and a head-up display. It shows a liquid crystal display plane being perpendicular to the optical axis. A polarizing plate is not perpendicular to the optical axis.

US 2011/0051029 relates to a display device, an electronic apparatus, and a projection imaging apparatus. It makes use of a wedge prism. However, this wedge prism does not provide a cooling function.

It is an object of the disclosure to propose a solution for a head-up display with improved sunlight reflection protection.

SUMMARY

A head-up display has an image generator with a light source, a tilted display, an aspheric mirror, an optical system and a transmissive screen. An aspheric lens is arranged between the display and the aspheric mirror. This reduces peak intensity of sunlight falling on the display. Sunlight may enter the head-up display in reverse direction. Although several means to reduce peak intensity are known, there is an ongoing need to further reduce it. The aspheric lens widens the light rays of the sunlight which are nearly parallel to each other, having a maximum deviation of 0.5°.

In one embodiment, the aspheric lens has a wedge component. The tilt of the display may be reduced by the wedge angle of the aspheric lens without reducing the ability to reflect sunlight that enters the head-up display along its main optical axis onto a light trap. The reduced tilt of the display increases the contrast visible from such reduced angle. It thus increases contrast of the virtual image generated by the head-up display.

In one embodiment, a display glass having a wedged shape is arranged close to or at the display. The tilt of the display may be reduced by the wedge angle of the display glass without reducing the ability to reflect sunlight that enters the head-up display along its main optical axis onto a light trap. The reduced tilt of the display increases the contrast visible from such reduced angle. It thus increases contrast of the virtual image generated by the head-up display.

In one embodiment, the display glass is a cooling glass. Such cooling glass is often applied onto the light exiting surface of the display in order to protect the display from overheating. Combining two functions, here cooling function and wedge shape function in a single element reduces number of parts and assembly costs.

In one embodiment, the display is tilted with regard to a main optical axis of the head-up display by a first angle and the display glass has a wedge angle with regard to the main optical axis, and wherein first angle and wedge angle add to an effective tilt angle. Therefore, both effects combine in full, thus increasing contrast very efficiently.

In one embodiment, the first angle is in the range of $\alpha=10°$ to $\alpha=20°$ and the wedge angle $\beta$ is in the rage of 10° to 15°. Commercially available displays exist that emit light along the optical axis if the display is tilted by an angle $\alpha$ in the mentioned range with regard to a plane orthogonal to this main optical axis. A prism with a wedge angle $\beta$ in the mentioned range leads to optical dispersion that is sufficiently small as to not have a negative influence on the drivers perception of the virtual image. Using a wedged display glass with the mentioned properties has the advantage that the light emitted by the display is further tilted in dependence on the wedge angle. The effective tilt of the display plane with regard to the main optical axis of the light exiting the display glass is thus further enlarged. This effect is desired in order to tilt the image plane of the virtual image with regard to the optical axis. The virtual image plane thus seems to be oriented nearly parallel to the road surface ahead of the vehicle in which the head-up display is installed. Different parts of the virtual image have their optimum sharpness at different distances from the driver. This gives the impression of a three-dimensional head-up display image: Elements displayed in the lower part of the virtual image appear closer to the driver than elements in the upper part or in the middle part. Displayed elements that are meant to augment real objects may be arranged close to these objects not only with regard to their position in the virtual image plane, but also in a focal distance that is comparatively close to their respective real object. Objects at the horizon with a big real distance are augmented with elements that are located in the virtual image at a far focal distance. Navigation supporting elements like arrows showing a turning direction to be followed are located in the virtual image at a location very close to the real road position at which the turn should be made, and—at the same time—with a focal distance close to the real distance of this real road position.

In one embodiment, the display glass is affixed to the tilted display. The display glass is for example glued or bonded in another way directly on the top layer of the display. This reduces the number of optical surfaces on which undesired reflections may occur.

According to another embodiment, the display glass is the layer of the display that is next to the optically active layer of the display. In case of a liquid crystal display the optically active layer is the liquid crystal which liquid is sandwiched by two transparent planes. According to this embodiment one of these planes belongs to the wedged display glass. This reduces the number of optical surfaces, thus reduces the potential for undesired reflections.

In one embodiment, at least one of the display glass and the aspheric lens is made of BK7 glass or is made of plastic.

Both are materials that are readily available and have known properties. Thus, their use will be cost efficient.

BRIEF DESCRIPTION OF THE DRAWINGS

The present disclosure will become more fully understood from the detailed description and the accompanying drawings, wherein.

DETAILED DESCRIPTION

Figure 1:
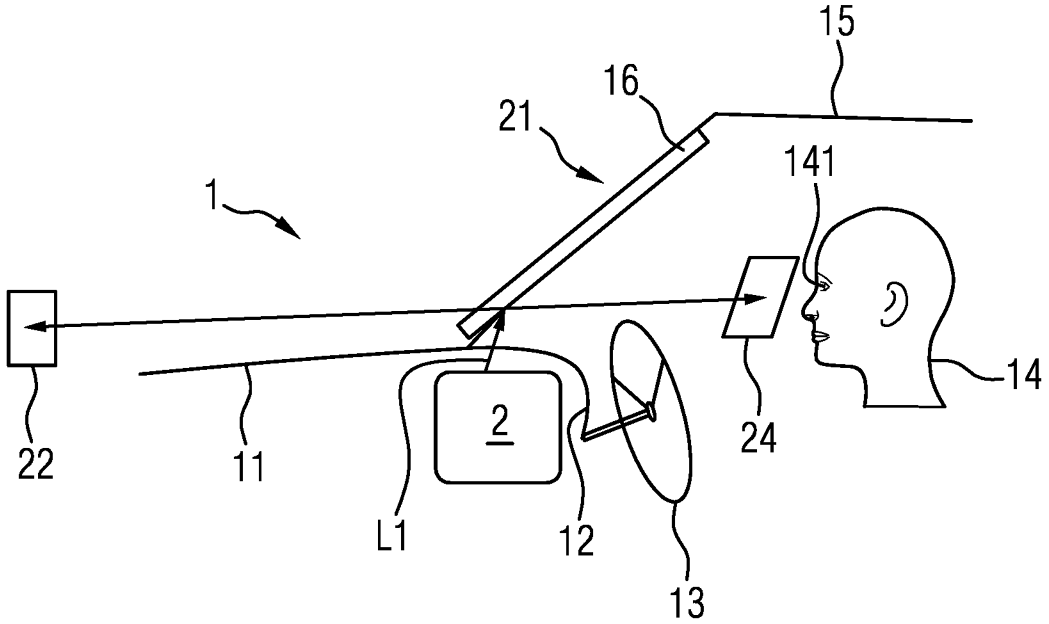
FIG. 1 shows a vehicle using a head-up display.

FIG. 1 shows a vehicle 1 using a head-up display 2, in the following also referred to as HUD 2. On the left side an engine hood 11 is visible. The HUD 2 is arranged below a dashboard 12. Behind the steering wheel 13, the driver's head 14 is shown. Between rooftop 15 and engine hood 11, a windshield 16 is arranged. The windshield 16 acts as a transmissive screen 21 of the head-up display 2. The HUD 2 generates optical beams L1, which are reflected at the transmissive screen 21 and fall into the driver's eye 141 as long as the eye 141 is within an area called eyebox 24. As long as the eye 141 is within the eyebox 24, the driver sees a virtual image 22 that appears to be outside the vehicle 1 in front of the windshield 16.

Automotive head-up displays 2 are used to convey critical vehicle information directly in the field of view of the vehicle's conductor or driver. The information is delivered to the driver at a certain distance so that no or nearly no accommodation of the drivers eye 141 is required when the driver switches from viewing the road in front of him to reading the vehicle's status shown as the virtual image 22. This approach reduces the reaction time of the driver by several hundreds of milliseconds, thus increasing road safety. At a speed of 120 km/h a 300 ms delay translates in a covered distance of about 10 m, which is about 10% of the total stop distance of the vehicle 1. As seen in FIG. 1, the head-up display 2 creates a virtual image 22 ahead of the transmissive screen 21. The transmissive screen 21 may be the windshield 16 of the vehicle 1, as shown, or a different, dedicated, partially reflective surface separated from the windshield. Such surface is a so-called combiner. The virtual image 22 is visible from a limited region of space only, the so-called eyebox 24.

It should be clear to a person skilled in the art that the depictions in the described figures are only simplifications done for ease of understanding. The real-life systems may differ in construction details without departing from the disclosure described with help of the figures. From this, it is to be understood that the used descriptive words should not be considered only for their basic meaning but also for equivalents.

The same reference signs are used for the same elements shown in the following figures. They are not necessarily described again, except if they differ in function or if such description seems meaningful with regard to the respective embodiment.

Figure 2:
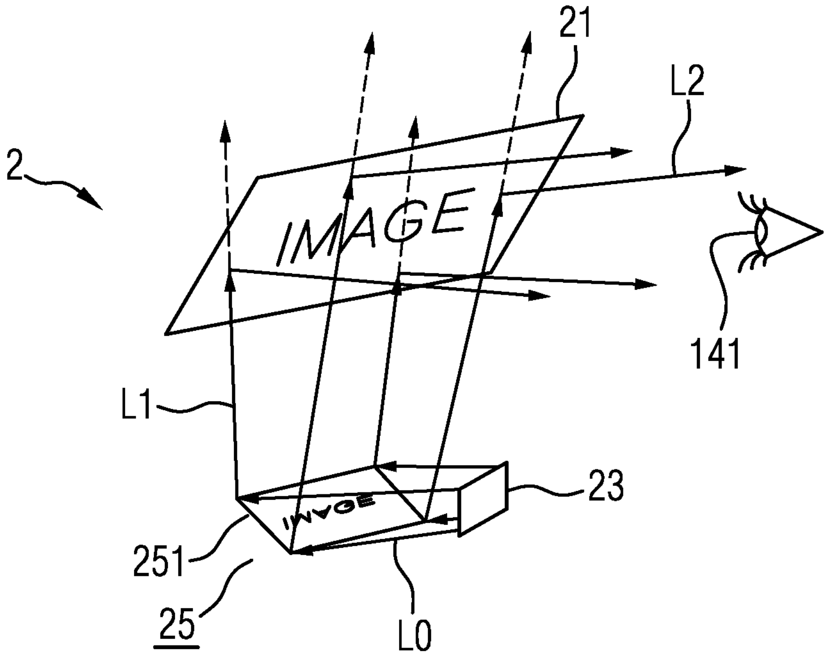
FIG. 2 shows a head-up display.

FIG. 2 shows a head-up display 2 having an image generator 23, also referred to as image projection system below, that generates an optical beam L0. The optical beam L0 enters a generic optical system 25, here illustrated by an optical mirror 251, from which an optical beam L1 is directed to the transmissive screen 21. In the embodiment shown the optical mirror is an aspheric mirror 251. A part of the light of beam L1 passes through the transmissive screen 21, which is indicated by dotted arrows. Another part is reflected by the transmissive screen 21 and thus reaches the driver's eye 141 as optical beam L2.

Figure 3:
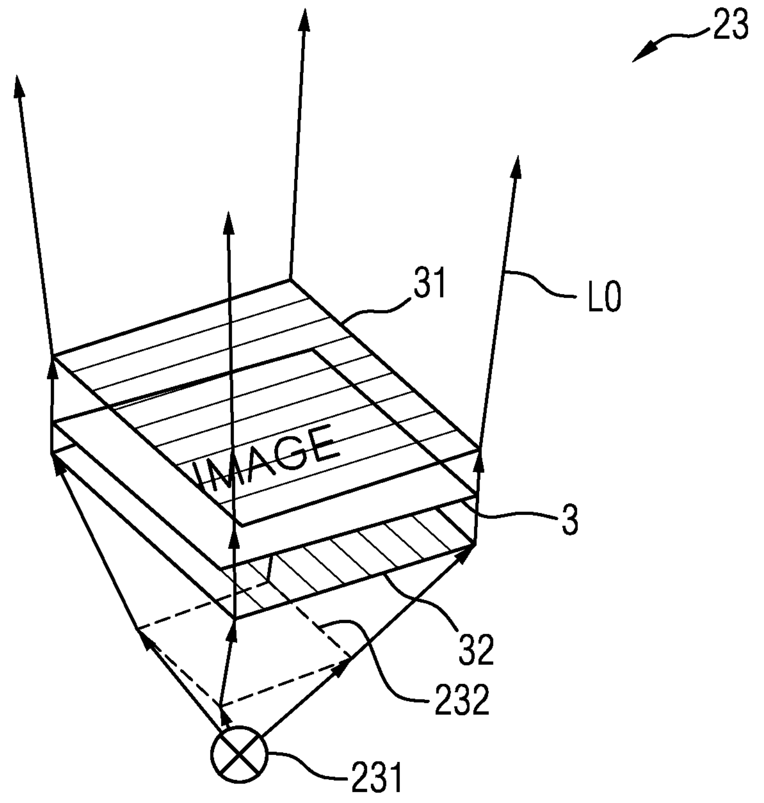
FIG. 3 shows an image projection system.

FIG. 3 shows an image projection system as image generator 23 having a light source 231, a diffuser 232, and a display 3, for example a transmissive liquid crystal display (LCD). At the front side of the display 3 a front polariser 31 is arranged. At the backside of the display 3 a back polariser 32 is arranged. The optical beam L0 leaves the image generator 23.

HUD systems as depicted in FIG. 2 and FIG. 3 usually consist of an image generator 23 coupled to an optical system 25 that directs the image formed by the image generator 23 onto a transparent screen, the transmissive screen 21. In the example shown, the image generator 23 is provided with a backlight unit, the light source 231, which for example uses LEDs, laser beam generators or is of any other type of light source. The image generator is further provided with an image forming system that may be a set of sweeping mirrors, micromirror arrays using MEMS technologies or, as shown in FIG. 3, an active matrix liquid crystal display constructed on a flat, rigid glass backplane. The essential parts of the image generator 23 for an LCD-based system as illustrated in FIG. 3 are, as backlighting source, the light source 231, together with the diffuser 232. The diffuser 232 may be a simple diffuser film or a mixed function film like a combination of a diffuser and a brightness enhancing film, the front and back polarising films 31, 32 and an LCD, the image forming display 3.

Figure 4:
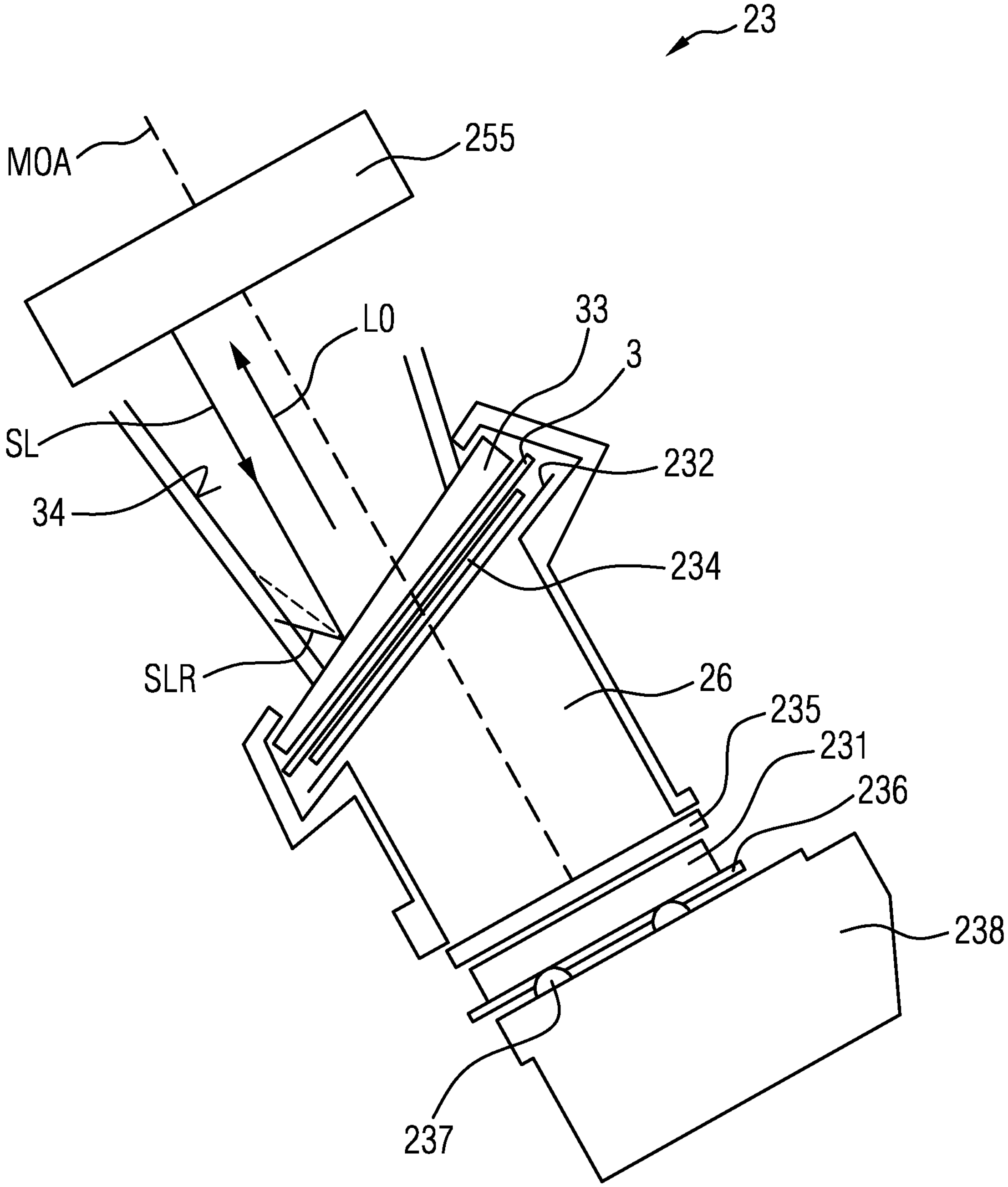
FIG. 4 shows an image generator according to the disclosure.

FIG. 4 shows an embodiment of an image generator 23 of a head-up display 2 according to the disclosure. The image generator 23 is provided with a light source 231, a tilted display 3, a display glass 33 as cooling glass and a light trap 34. The cooling glass 33 has a wedged shape. An aspheric lens 255 is arranged between display 3 and an aspheric mirror 251. The optical system 25, the aspheric mirror 251 and the transmissive screen 21 are not shown here.

A liquid crystal display 3 is arranged tilted with regard to a main optical axis MOA of the head-up display 2. A cooling glass 33 is arranged on the light exiting side of the liquid crystal display 3. The cooling glass 33 is shaped as a wedge. Below the liquid-crystal display 3, on its light incoming side, a diffuser 232 is arranged. Optical foils 234 are arranged between display 3 and diffuser 232, but not explained in more detail here. Below the diffuser 232, a lightbox 26 is arranged. At the end of the lightbox 26 opposite to the diffuser 232, light emitting diodes (LED) are arranged as light source 231. Above the LEDs, lenses 235 are arranged. The LEDs as light source 231 are placed on a printed circuit board (PCB) 236. The printed circuit board 236 acts as electric insulator between light source 231 and a heatsink 238 as well as a thermal insulator between these. The printed circuit board 236 is provided with vias 237 filled with metal or another highly thermally conductive medium in order to transport heat generated by the light source 231 to the heatsink 238.

Light generated by the light source 231 passes through the lens 235, travels through the lightbox 26 and passes through diffuser 232, optical foils 234 and the liquid display 3. An optical beam L0 leaves the liquid-crystal display 3 and passes through the wedge-shaped cooling glass 33 in direction to the generic optical system 25, not shown here.

Sunlight SL may enter the head-up display 2, mainly if it passes through the windshield 16 parallel to the main optical axis MOA of the head-up display 2. When reaching the cooling glass 33 it is reflected. Due to the inclination of the surface of the cooling glass 33 with respect to the main optical axis MOA, the reflected sunlight SLR is not parallel to the main optical axis MOA and thus does not reach the driver's eye 141 but is absorbed at a light trap 34.

Figure 5:
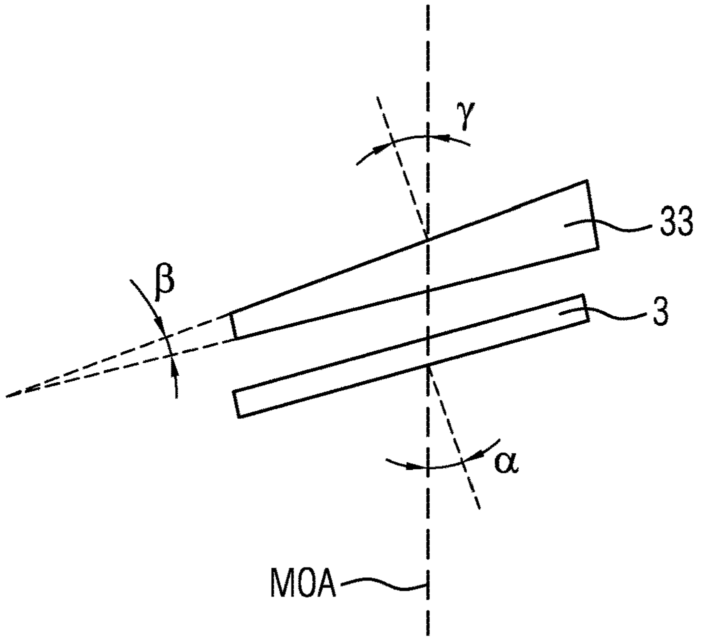
FIG. 5 shows a display and display glass.

FIG. 5 shows that the display glass 3 is tilted with regard to the main optical axis MOA of the head-up display 2 by a first angle α. The cooling glass 33 has a wedge angle β with regard to said main optical axis MOA. The first angle α and the wedge angle β add to an effective tilt angle γ. In this figure display 3 and display glass 33 are arranged with a distance to each other. In another preferred embodiment as shown in the previous figure the wedged display glass 33 is arranged directly on the top layer of the display 3. The display glass 33 in this case is affixed to the tilted display 3, e.g. by being glued thereon or bonded thereto in an appropriate manner. According to another embodiment the display glass 33 is the top layer of the display 3. The display glass 33 in this case is the layer of the display 3 that is next to the optically active layer of the display 3.

Figure 6:
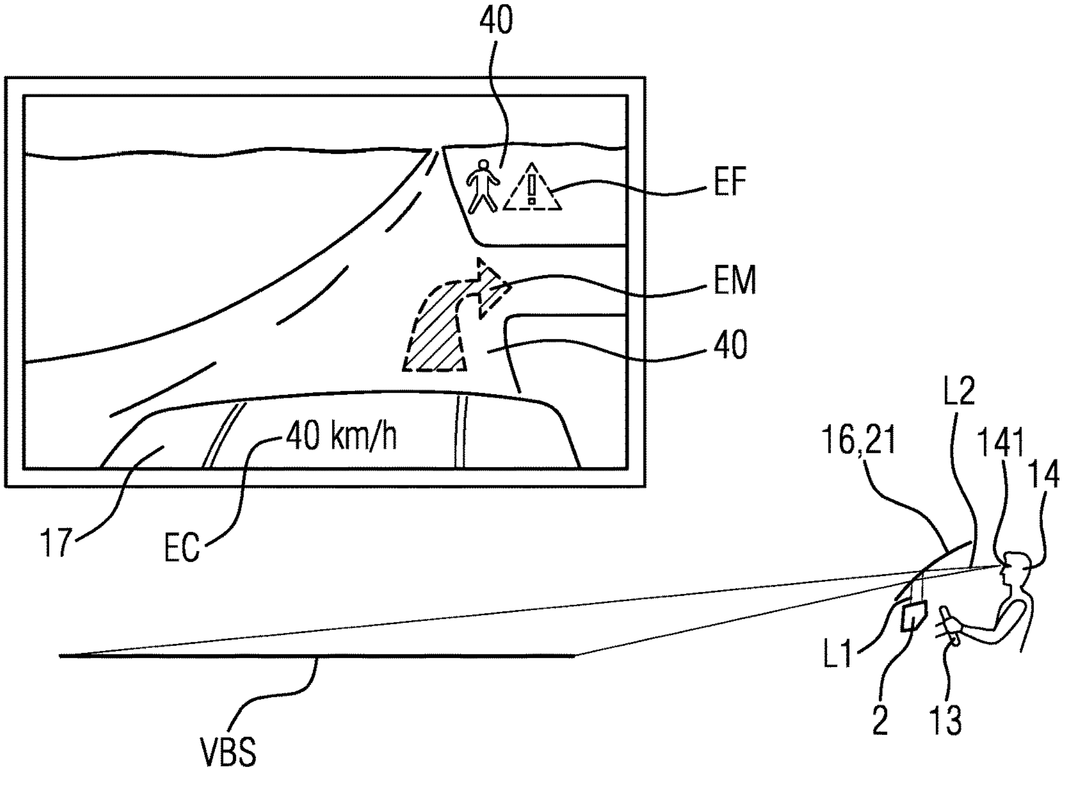
FIG. 6 shows a schematic view of a sloped virtual image.

FIG. 6 shows a schematic side view of the position of a sloped virtual image VBS that is made possible according to the disclosure as well as an exemplary view that the driver has through the windshield of the vehicle. The head-up display 2 has a tilted display 3 and a wedged display glass 33 (both not shown here) according to the disclosure. Due to the large effective tilt of the display 3, also the virtual image generated therefrom is a sloped virtual image VBS that is nearly parallel to the road surface. The optical light beam L1 generated by the head-up display 2 is reflected by the windshield 16 as transmissive screen 21 and reaches the driver's eye 141. The driver sees the upper part of the displayed image e.g. at a focal distance of 8 m (left part of the sloped virtual image VBS in the figure), and the lower part of the displayed image e.g. at a focal distance of 4 m (right part of the sloped virtual image VBS in the figure).

The upper left part of FIG. 6 depicts an exemplary view that the driver has through the windscreen of the vehicle. Elements EC, EM, EF of the virtual image are indicated by dashed lines and have partly hashed areas, while real world elements are indicated by continuous lines. A current speed (here: 40 km/h) is indicated as close element EC at the lower part of the virtual image. It is visible above the hood (bonnet) 17 of the vehicle and has a focal distance of about 4 m. A navigation arrow that indicates a suggested turn to the right is indicated as element EM of medium distance in the middle part of the virtual image VBS. It is visible above the road surface 40 at a focal distance of about 6 m. At a farther distance a pedestrian 41 is indicated. Next to the pedestrian 41 a warning sign is displayed as far element EF. It augments the reality, here: the pedestrian 41, with important information for the driver, here: a warning, e.g. that this pedestrian 41 might cross the road 40. The far element EF of the virtual image has a focal distance of about 8 m.

Figure 7:
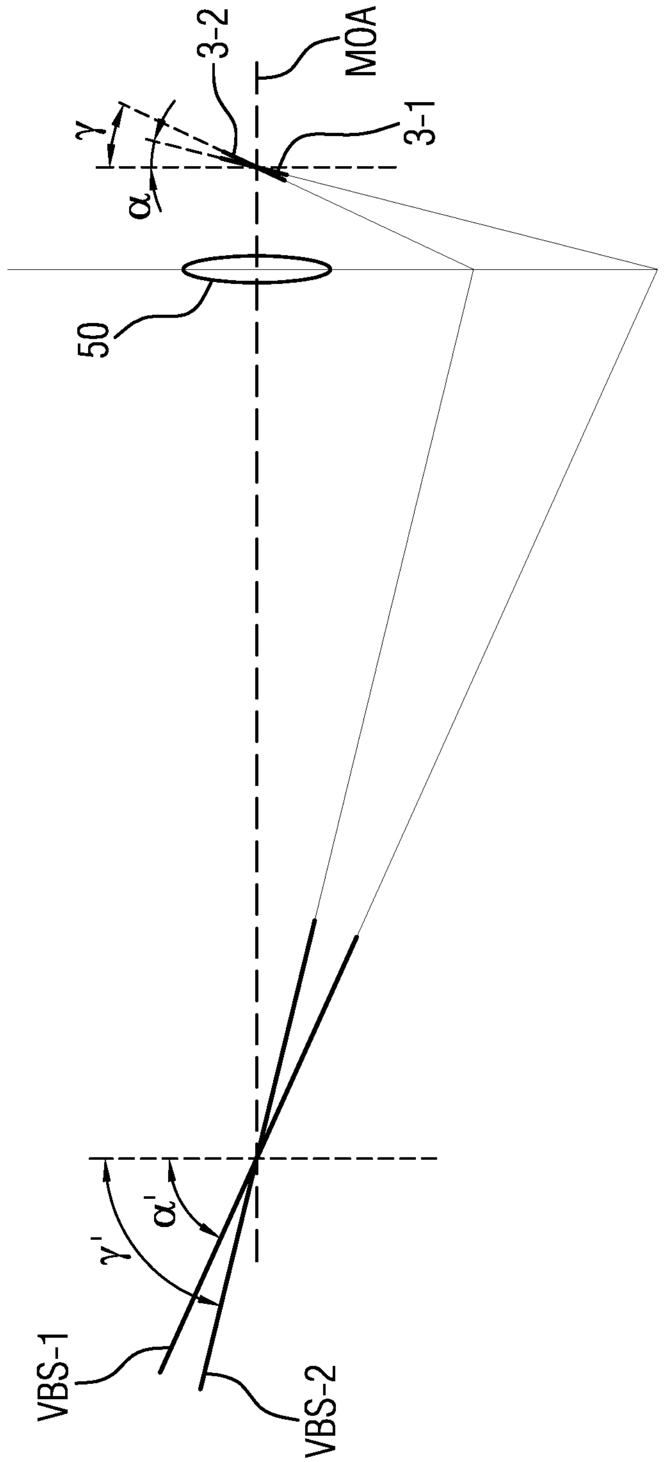
FIG. 7 shows effect of the tilt of a display.

FIG. 7 illustrates schematically the effect of the tilt of a display 3, 3-1, 3-2 on the sloped virtual image VBS, VBS-1, VBS-2. An optical lens 50 is arranged on a main optical axis MOA. For simplicity reasons the optical lens 50 is a placeholder for all optical elements of the head-up display 2 that are arranged between display 3 and sloped virtual image VBS. Display 3-1 is tilted about first angle α with regard to a plane orthogonal to the main optical axis MOA. Together with the optics indicated here by the optical lens 50 it generates a sloped virtual image VBS-1 that is tilted about an angle α' with regard to a plane perpendicular to the main optical axis MOA. Another display 3-2 is shown in the figure that is tilted by an angle γ. It generates a sloped virtual image VBS-2 that is tilted about an angle γ'. The plane in which the sloped virtual image VBS-1 lies, the plane in which the display 3-1 lies and the plane of the optical lens 50 which is orthogonal to the main optical axis MOA intersect in a line, that is a point in the drawing plane of this figure. Similarly, the other display 3-2 and the other sloped virtual VBS-2 are related to each other.

Figure 8:
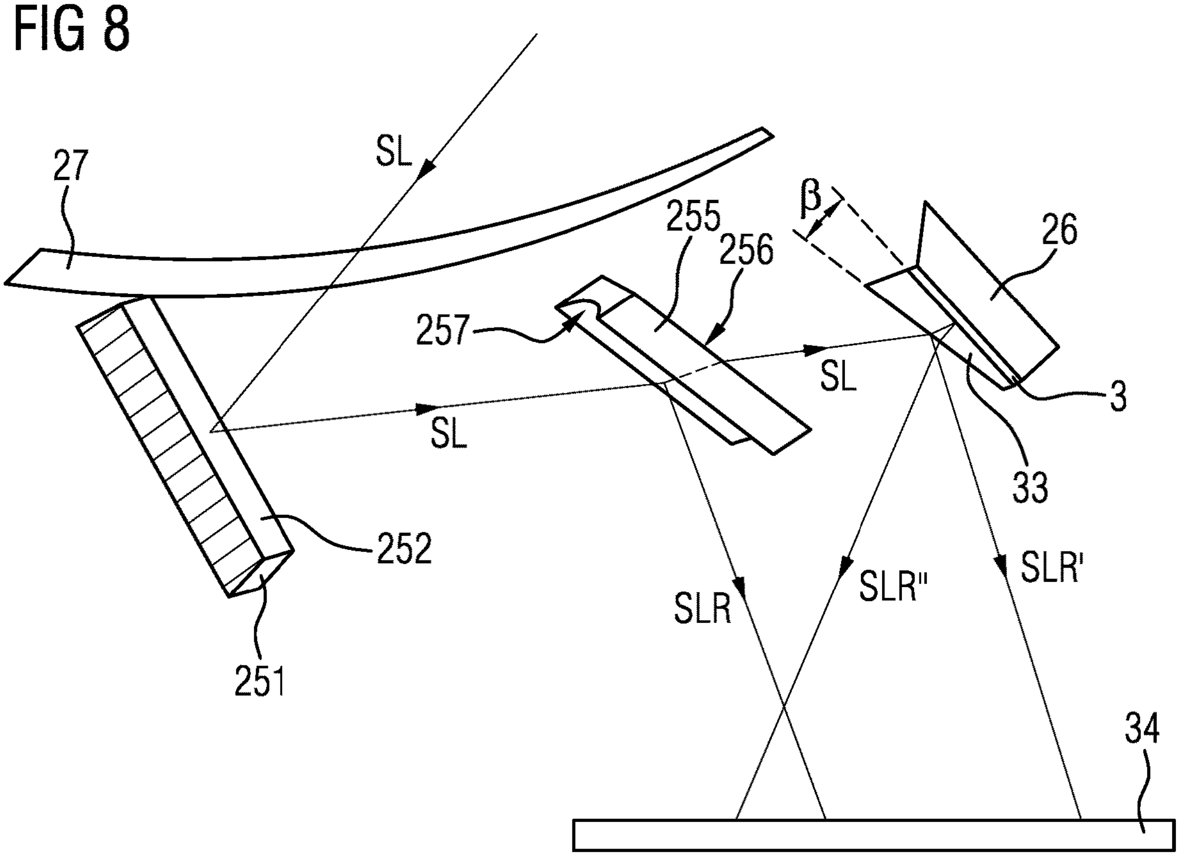
FIG. 8 shows an arrangement according to the disclosure.

FIG. 8 schematically shows an arrangement according to the disclosure. At the end of lightbox 26 the display 3 is arranged. Next to the display 3 a wedged display glass 33 is arranged. It has a wedge angle β. In a distance an optical mirror 251 is arranged. In the embodiment shown it has an aspheric mirror surface 252. Between the display glass 33 and the aspheric optical mirror 251 the aspheric lens 255 is arranged, In this embodiment it has a plane surface 256 at its side facing the display 3 and an aspheric surface 257 at its side facing the aspheric mirror 251. The aspheric lens is tilted with regard to the main optical axis MOA (not depicted here). Above the optical mirror 251 a top cover 27 of the head-up display 2 is shown. Sunlight SL passes through the transparent top cover 27 and is reflected by the aspherical mirror surface 252 towards the display glass 33. A part of the sunlight SL is reflected as reflected sunlight SLR on the aspheric surface 257 of the aspheric lens 255 towards a light trap 34. Another part is refracted when entering the aspheric lens 255 at its aspheric surface 257 and refracted again at its backside when passing the plane surface 256. The thus remaining sunlight SL travels to the display glass 33. A part of the sunlight SL is reflected as reflected sunlight SLR' on the outer surface of the display glass 33 towards a light trap 34. Another part of the sunlight is refracted inside the display glass 33, reflected at its inner surface, refracted when passing its outer surface and directed to the light trap 34 as reflected sunlight SLR". As can be seen, a big amount of sunlight SLR, SLR', SLR" is reflected towards the light trap 34. The remaining sunlight that reaches the display 3 is already dispersed by the prism shape of the wedged display glass 33 and by the effect of the aspheric lens 255. It is thus less focussed on the display 3 which prevents small temperature hotspots, but rather leads to temperature blots having a larger area thus causing less heat stress. As the display glass 33 is arranged as cooling glass that conducts heat away from the display 3, the arrangement shown here has good heat resilience.

Figure 9:
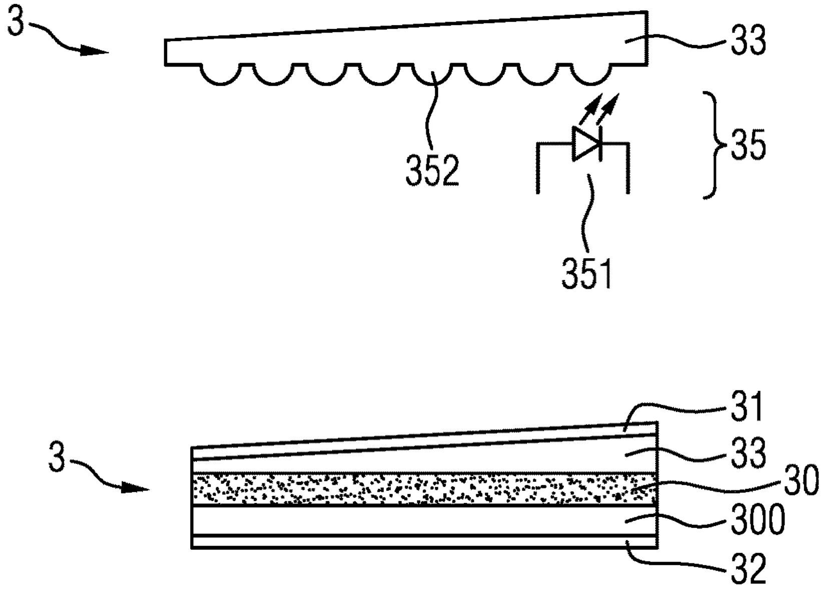
FIG. 9 shows display glass next to the optically active layer.

FIG. 9 shows two embodiments where the display glass 33 is the layer of the display 3 that is next to the optically active layer 30, 35 of the display 3. In the upper part of the figure an LED (Light Emitting Diode) display is shown schematically. LEDs 351 are arranged in an LED layer 35, which acts as optically active layer: Only a single LED 351 is shown here for simplicity. The LEDs 351 are arranged as matrix. The image is generated by turning on or off LEDs 351 of the matrix. The display glass 33 in this embodiment is provided with lenslets 352 at its lower surface. For each LED 351 a lenslet 352 is available to collect the light emitted from the LED 351. The display glass 33 has a wedged shape as already described with regard to previous figures. In the lower part a liquid crystal display is shown. The optically active layer is the liquid crystal layer 30 that is sandwiched between a transparent substrate 300 and the wedge-shaped display glass 33. Atop of the display glass 33 a front polarizer 31 is arranged. At the lower surface of the substrate 300 a back polarizer 32 is arranged.

Figure 10:
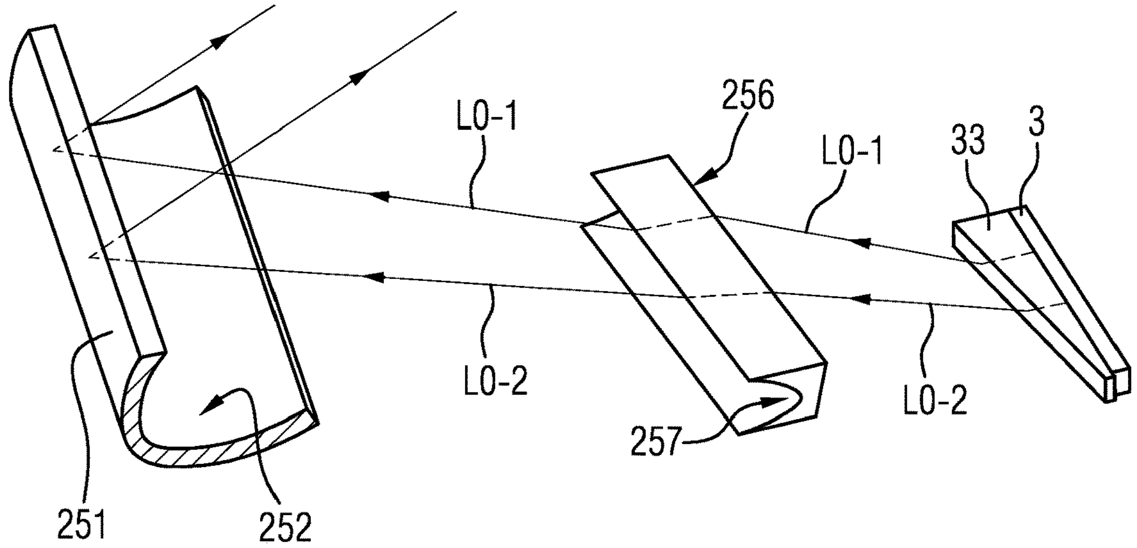
FIG. 10 shows an arrangement according to the disclosure.

FIG. 10 schematically shows an arrangement according to the disclosure. At the right side a display 3 with a wedged display glass 33 affixed to its light emitting surface is shown. Two exemplary light rays L0-1, L0-2 are also depicted. They are emitted from the display 3 and pass through (dotted line) the display glass 33. They are refracted when passing the front surface of the display glass 33. Then the light rays L0-1, L0-2 travel to the aspheric lens 255 which they enter through its plane surface 256. They are refracted and again refracted when passing the aspheric surface 257. Then the light rays L0-1, L0-2 travel to the aspheric mirror 251 where they are reflected at its aspheric mirror surface 252 to leave the head-up display 2 as light rays L1-1, L1-2 through its top cover 27 (not shown here).

Figure 11:
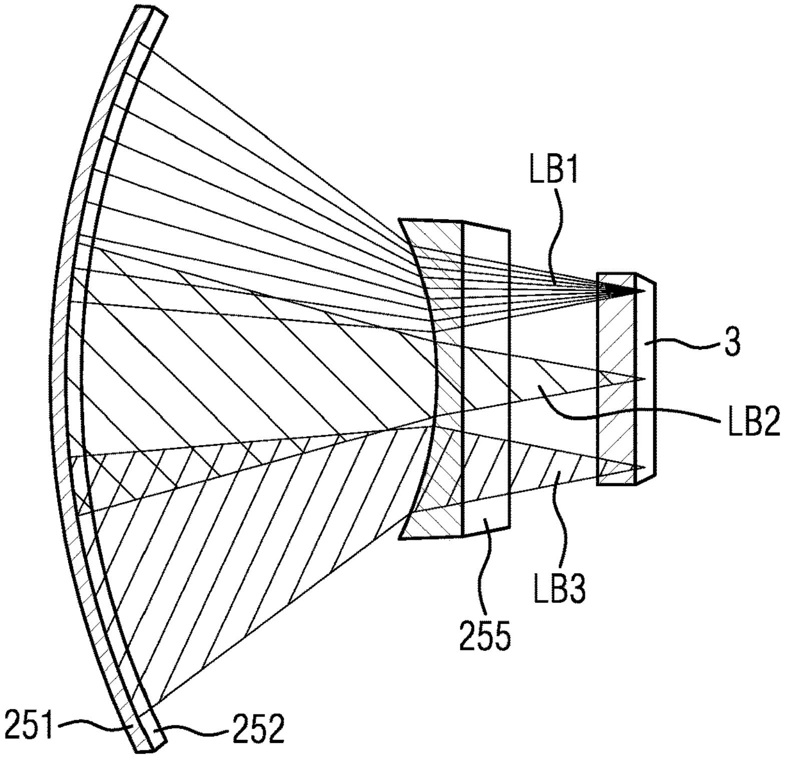
FIG. 11 shows an arrangement according to the disclosure.

FIG. 11 shows a plano-aspheric lens 255 arranged between aspheric optical mirror 251 and display 3. Three light bundles LB1, LB2, LB3 that are emitted from three different positions on the display 3 are shown. The light bundles LB1, LB2, LB3 are diverged by the aspheric lens 255 and changed in their direction, so that at the end the full surface 252 of the aspheric mirror 251 is covered. For simplicity the further light paths are not shown here.

The disclosure suggests using a refractive aspheric lens 255 in the beam path between a display 3 as image source and an aspheric optical mirror 251 of a head-up display 2. This head-up display generates a single virtual image 22, VBS which is not oriented in a plane that is nearly orthogonal to the forward direction of the vehicle the head-up display 2 is mounted in but is sloped thereto. The upper part of the sloped virtual image VBS has a larger focal distance to the driver of the vehicle than the lower part of the sloped virtual image VBS. This single virtual image VBS is thus comparable to a head-up display that generates two or more image planes at different focal distance to allow augmented reality (AR) functionality where elements displayed by the head-up display that augment real objects may be placed in respective different focal distances as fits best to the real objects' distance to the driver. The head-up display 2 according to the invention may be called to provide "quasi-AR functionality", as elements to be displayed may be placed at different focal distances by placing them in different horizontal stripes of the sloped virtual image VBS. Conventional head-up displays that use a TFT (thin film transistor) technology base liquid crystal display may tolerate only a small tilt of the image plane of the virtual image with regard to a plane perpendicular to the optical axis. The optical axis usually nearly coincides with the forward direction of the vehicle the head-up display is mounted at. Such small tilt is not sufficient for the quasi-AR effect desired. If the tilt at such conventional head-up displays is chosen large enough for a quasi-AR effect, then optical performance, contrast and brightness degrade, and undesired heat effects due to sunlight that enters the head-up display increase so that the appearance of the virtual image is no longer acceptable. A solution that allows for a largely tilted virtual image is desired, as such sloped virtual image is a precondition to display augmented reality elements using a single virtual image, in a pseudo-AR head-up display.

The disclosure relates to such quasi-AR head-up display having an image source, here the display 3, and at least one aspheric optical mirror 251. According to the disclosure at least an aspheric lens 255 is arranged in the beam path between image source and aspheric mirror 251. This leads to a better distribution of the peak intensity of sunlight SL that enters the head-up display 2. This peak intensity on the display 3 is reduced and distributed over a larger area. Thus, heating up of the display 3 is reduced. This is important in case of a display technology for which overheating is critical, e.g. liquid crystal technology where the liquid crystal material does not work properly above a critical temperature. Also, the amount of sunlight that is reflected by the display 3 and may reach the driver's eye 141 is reduced. Thus, irritation of the driver is prevented, driving safety is increased. Further, the arrangement according to the disclosure provides for an enlarged exit pupil, which is a desired effect. The tilt angle of the display 3 needed to generate a sloped virtual image VBS as desired for a quasi-AR head-up display is reduced. It is thus made possible to use the display 3 in a geometrical orientation in which good contrast and high brightness are reached. Also, the optical performance is improved thereby. It also allows to optimize the space requirement for the head-up display 2. In one embodiment, the aspheric lens 255 is a plano-concave lens, or a plano-aspheric lens as shown in some of the figures. Alternative solutions are to use a convexo-concave lens arranged between display 3 and aspheric mirror 251, or a convex-aspheric lens. It is also preferred to provide these elements with a wedge form, and/or to combine it with a prism or wedge-shaped display glass 33, which even more increases efficiency.

The disclosure further suggests also using a wedged display cover glass 33 in a head-up display 2. A head-up display 2 usually contains a PGU (Picture Generating Unit) which is typically tilted in respect to the Gut Ray or main optical axis MOA to avoid direct sun reflections and/or to control the tilt of the projected virtual image 22. In both cases the needed amount of tilting of the real image plane (in the figures above: the light exiting plane of the liquid crystal display 3) influences negatively the performance of the PGU in terms of efficiency and contrast. In addition, a cooling glass may be put on the image plane (e.g. onto the light exiting plane of a liquid crystal display according to Thin Film Transistor technology (TFT) or onto a screen on which an image is projected) to improve the sun-load behaviour. This cooling glass is typically flat, has a thickness in the range of 1 mm . . . 10 mm, and is attached to the display or to the image plane. According to the disclosure the display tilt (in respect to Gut Ray) is reduced by using a wedged cooling glass 33. The wedged glass 33 works as a prism or as a laterally shifted lens which refracts the light with an additional angle. This approach allows to keep the tilted focus plane used for reflecting sunlight SL onto a light trap 34 by decreasing the effective display tilt. This approach may be used for display applications and even for projection type systems where the intermediate plane (screen) represents the image plane. This wedged cover glass 33 may be made from different materials like BK7 or even plastic.

The invention claimed is:

1. A head-up display, comprising:

an image generator with a light source;

a tilted display, having a wedge shaped display glass that is spaced apart from the tilted display, wherein a first surface of the wedge shaped display glass faces and is parallel to the display;

an aspheric mirror;

an optical system;
a transmissive screen; and
an aspheric lens, wherein the aspheric lens is arranged between the tilted display and the aspheric mirror such that:
the aspheric lens reflects a first portion of incident sunlight towards a light trap, and refracts a second portion of incident sunlight towards the wedge shaped display glass; and
a virtual image formed by the head up display has an upper part of the virtual image that has a greater focal distance than a lower part of the virtual image due to an effective tilt angle of the display,
wherein the wedge shaped display glass refracts a second portion of the sunlight inside the wedge shaped display glass, which is reflected at its inner surface, refracted when passing its outer surface and directed to the light trap.

2. The head-up display according to claim 1, wherein the aspheric lens has a wedge component.

3. The head-up display according to claim 1, wherein the wedge-shaped display glass is a cooling glass.

4. The head-up display according claim 1, wherein the tilted display is tilted with regard to a main optical axis of the head-up display by a first angle and the wedge-shaped display glass or the wedge-shaped aspheric lens has a wedge angle with regard to the main optical axis, and wherein first angle and wedge angle add to the effective tilt angle.

5. The head-up display according to claim 4, wherein the first angle is in the range of 10° to 20° and the wedge angle is in the range of 10° to 15°.

6. The head-up display according to claim 1, wherein the wedge-shaped display glass is affixed to the tilted display.

7. The head-up display according to claim 1, wherein the wedge-shaped display glass is the layer of the tilted display that is next to an optically active layer of the tilted display.

8. The head-up display according to claim 1, wherein the wedge-shaped display glass and/or the aspheric lens is made of BK7 glass or is made of plastic.

9. The head-up display according to claim 1, wherein the virtual image appears parallel to a road surface.

10. The head-up display according to claim 1, wherein remaining sunlight that reaches the display is already dispersed by the prism shape of the wedge-shaped display glass and by the aspheric lens to prevent temperature hotspots.

11. The head-up display according to claim 1, wherein the aspheric lens widens light rays of the sunlight, having a maximum deviation of 0.5°.

* * * * *